United States Patent [19]

Tanaka

[11] Patent Number: 4,561,788
[45] Date of Patent: Dec. 31, 1985

[54] CLUTCH RELEASE BEARING DEVICE

[75] Inventor: Kenji Tanaka, Fujisawa, Japan

[73] Assignee: Nippon Seiko Kabushiki Kaisha, Tokyo, Japan

[21] Appl. No.: 686,724

[22] Filed: Dec. 27, 1984

[30] Foreign Application Priority Data

Oct. 4, 1984 [JP] Japan .............................. 59-149593[U]

[51] Int. Cl.⁴ ...................... F16C 27/06; F16D 23/14
[52] U.S. Cl. ...................................... 384/513; 192/98;
192/110 B; 384/536; 384/611
[58] Field of Search ....................... 384/492, 510–515,
384/535–537, 543, 590–592, 611, 615, 617;
192/110 B, 98

[56] References Cited

U.S. PATENT DOCUMENTS

| | | | |
|---|---|---|---|
| 3,604,545 | 9/1971 | Bourgeois | 384/536 X |
| 3,885,840 | 5/1975 | Neder | 384/536 |
| 3,904,008 | 9/1975 | Sonnerat | 192/98 |
| 4,117,916 | 10/1978 | Baker | 192/110 B X |
| 4,142,618 | 3/1979 | Fontaine et al. | 384/535 X |
| 4,181,380 | 1/1980 | Vinel et al. | 384/611 |
| 4,351,427 | 9/1982 | Miyahara | 192/110 B X |
| 4,357,058 | 11/1982 | Sonnerat | 384/611 |
| 4,365,850 | 12/1982 | Perrichot et al. | 384/611 |
| 4,371,068 | 2/1983 | Billet | 192/110 B X |

FOREIGN PATENT DOCUMENTS 2855110  7/1979  Fed. Rep. of Germany ... 192/110 B

Primary Examiner—Stuart S. Levy
Assistant Examiner—Thomas R. Hannon
Attorney, Agent, or Firm—Wyatt, Gerber, Shoup, Scobey and Badie

[57] ABSTRACT

A clutch release bearing device including a clutch release bearing and bearing retainer comprising a cylindrical portion made of synthetic resin fitted to the fixed guide of a clutch, and a radially extending portion made of a metal extending radially outwardly from the cylindrical portion and having the inner side edge thereof embedded in the cylindrical portion and retaining the clutch release bearing for self-aligning and engageable with a clutch operating fork member.

2 Claims, 19 Drawing Figures

CLUTCH RELEASE BEARING DEVICE

BACKGROUND OF THE INVENTION

1. Field of the Invention

This invention relates to a clutch release bearing device used to release a clutch in an automobile or the like.

2. Description of the Prior Art

A clutch release bearing device of the type which includes a clutch release bearing, bearing retaining means for retaining the bearing in a predetermined state and biasing means for urging the bearing against the bearing retaining means is known, for example, from British Pat. No. 1,382,354. In the bearing device of this type, the bearing retaining means comprises a driving member made of synthetic resin including a cylindrical portion positioned inside an inner race and a portion extending radially outwardly from the cylindrical portion on one side of the inner and outer races. The operating force for clutch releasing operation is transmitted to a diaphragm spring through the bearing by a fork member bearing against the radially extending portion of the driving member and moving the driving member axially on a fixed guide member.

The driving member effects the operation as described above and therefore, its cylindrical portion is required to abound in slidability, while the radially extending portion is required to be high in strength and small in variation with time. To meet these two requirements, in the above-described example of the prior art, the entire driving member has been formed of synthetic resin containing glass fiber and further, a metal plate (anvil) has been embedded in a region opposed to a fork operating member.

By doing so, the requirements have been nearly satisfied with regard to the radially extending portion, but yet a problem is left to be solved with regard to the cylindrical portion. The problem is that since the cylindrical portion is formed of synthetic resin containing glass fiber, the glass fiber is exposed to the surface and abrades the guide member to hamper the clutch operation even if the cylindrical portion is lubricated. For all that, a material excellent in both slidability and rigidity is costly and difficult to mold.

SUMMARY OF THE INVENTION

It is therefore a primary object of the present invention to provide a clutch release bearing device including a driving member readily slidable along a fixed guide and high in rigidity.

It is another object of the present invention to provide a clutch release bearing device including a driving member comprising a cylindrical portion made of synthetic resin and a radially extending portion made of a metal.

It is still another object of the present invention to privide a clutch release bearing device including a driving member in which a cylindrical portion made of synthetic resin and a radially extending portion made of a metal extending radially outwardly therefrom are rigidly coupled together in the inner side edge of the radially extending portion.

According to the present invention, synthetic resin only forms the cylindrical portion and not the radially extending portion and therefore, as compared with a case where the entire driving member is formed of synthetic resin, the amount of synthetic resin used is reduced by half. A great load is not applied to the cylindrical portion and therefore, when the kind of synthetic resin is to be chosen, an inexpensive material can be chosen with importance being attached to slidability rather than to rigidity. Also, since the radially extending portion against which the fork member bears is made of a metal, this portion is not abraded by releasing operation.

When the cylindrical portion made of synthetic resin and the radially extending portion made of a metal (anvil) are to be coupled together, these two portions may be integrally molded and the inner end portion of the radially extending portion may be embedded in the cylindrical portion, whereby the assemblage of the two portions can be omitted, and this leads to a reduced manufacturing cost.

If an aperture is formed in the inner end portion of the radially extending portion and this aperture is also filled with synthetic resin when the radially extending portion and the cylindrical portion are integrally molded, the strength of coupling between the cylindrical portion and the radially extending portion will be further improved by the synthetic resin in the aperture.

DESCRIPTION OF THE PREFERRED EMBODIMENTS

Some embodiments of the present invention will hereinafter be described in detail by reference to the drawings.

Figure 1:
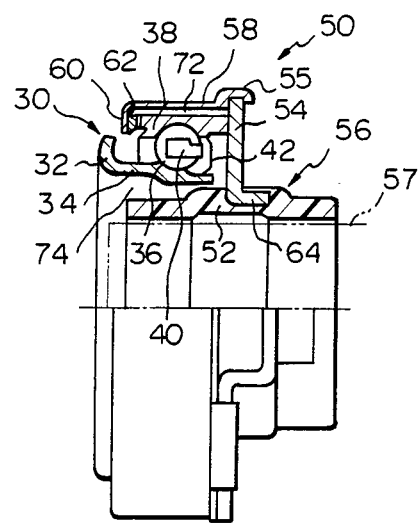
FIG. 1 is a front view partly in cross-section showing a first embodiment of the present invention.

As shown in FIG. 1, a clutch release bearing 30 includes an inner race 34 provided with a portion 32 bearing against a diaphragm spring (not shown), an outer race 38, a plurality of rolling members 36 interposed between the inner race and the outer race, a retainer 40 for retaining the rolling members 36, and a seal 42 for sealing the bearing. On the other hand, bearing retaining means 50 includes a driving member 56 comprising a cylindrical portion (sleeve) 52 of synthetic resin fitted to a fixed guide (not shown) for guiding the clutch release bearing and a disc portion (anvil) 54 of metal extending radially outwardly from the axially intermediate portion thereof and having the cylindrical portion 64 of the inner edge embedded in the sleeve 52 (the anvil 54 being coupled to the sleeve 52 by integral molding), a case 58 having the caulking portion 55 of one end thereof fixed to the disc portion 54 and extending sideways of the outer race 38, and a spring 62 interposed between the bent portion 60 of the case 58 and the outer race 38 to urge the bearing 30 toward the bearing retaining means 50.

The operation of the present embodiment will now be described. When a fork member (not shown) bears against the anvil 54 and applies an operating force in a thrust direction thereto, the bearing 30 is moved in the same direction through the driving member 56, and the portion 32 of the inner race 34 comes into contact with the diaphragm spring to thereby release the clutch. On the other hand, the self-aligning operation of the bearing 30 is accomplished by the bearing 30 being moved in a radial direction by the action of a centripetal force while being guided by the anvil 54. In that case, the clearance 72 between the outer race 38 and the case 58 and the clearance 74 between the inner race 34 and the sleeve 52 permit the movement of the bearing 30.

According to the present embodiment, the sleeve 52 of which slidability is required is made of synthetic resin and the anvil 54 of which rigidity is required is made of a metal and therefore, the driving member 56 is not damaged by the fork member and moreover smoothly slides on a sliding shaft and effects a clutch releasing action.

Figure 4:
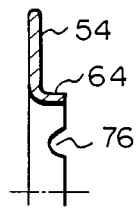
FIGS. 4A, 4B, 4C, 4D, 4E, 4F, 4G, 4H, 4I, 4J and 4K are front views partly in cross-section showing modifications of the radially extending portion.

If, as shown in FIG. 4A, one or more cut-aways 76 are formed in the cylindrical portion 64 of the anvil 54 as required, it will be effective in preventing the creeping of the anvil 54 and the sleeve 52. Also, the region of the anvil 54 which is in contact with the fork member may be heat-treated to prevent the wear thereof.

Figure 2:
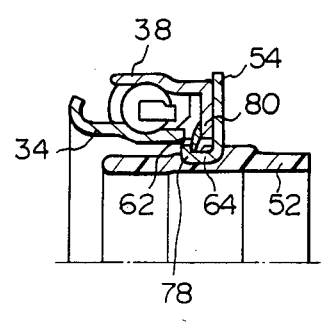
FIGS. 2 and 3 are front views partly in cross-section showing a second embodiment and a third embodiment, respectively, of the present invention.
Figures 4B, 4C, 4D, 4E:
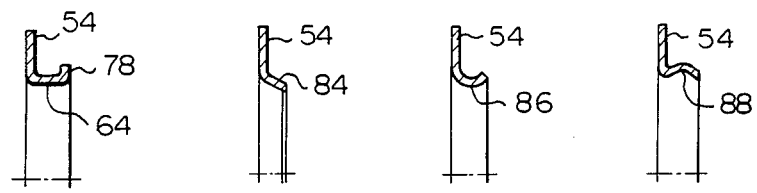

The other embodiments of the present invention will now be described. In a second embodiment shown in FIG. 2, the shapes of the outer race 38 and the anvil 54 and the location at which the spring 62 is disposed differ from those in the above-described embodiment. That is, as shown in FIG. 4B, the anvil 54 is formed with an outwardly facing flange portion 78 continuous to a cylindrical portion 64 on the inner edge thereof, and the cylindrical portion 64 is embedded in the sleeve 52 and a spring 62 is interposed between the flange portion 78 and the extension 80 of the outer race 38.

Figure 3:
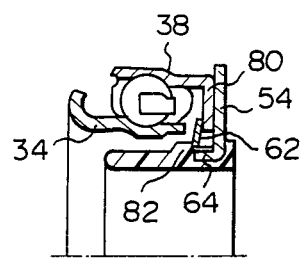

In a third embodiment shown in FIG. 3, the end face of a stepped portion 82 formed in the sleeve 52 performs the function of the flange portion 78 in the above-described embodiment, and a spring 62 is interposed between this stepped portion 82 and the extension 80 of the outer race 38. Therefore, a member provided only with a cylindrical portion 64 is used as the anvil 54.

Figures 4F, 4G, 4H, 4I:
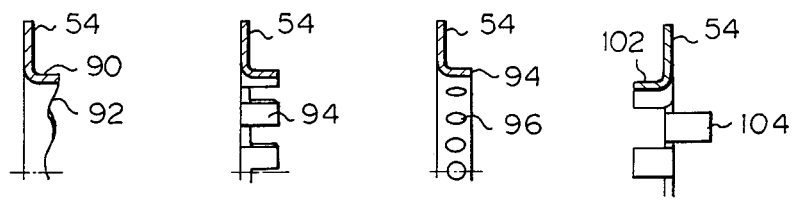
Figure 4J:
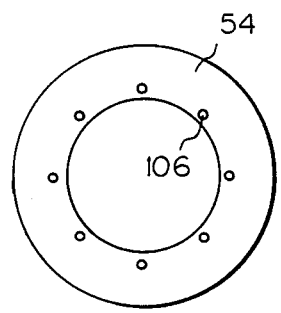
Figure 4K:
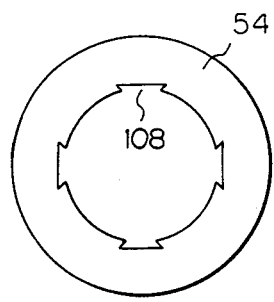

Modifications of the anvil 54 will now be described successively. A funnel portion 84 having a diameter gradually varying in the axial direction is formed on the inner peripheral edge of the anvil 54 shown in FIG. 4C, and an inwardly or outwardly curved portion 86 or 88 is formed on the inner peripheral edge of the anvil 54 shown in FIG. 4D or 4E. In the anvil 54 shown in FIG. 4F, a corrugation 92 is formed on the opening side of a cylindrical portion 90, and protrusions 94 are formed in the anvil 54 shown in FIG. 4G. A number of circular apertures 96 are formed in the cylindrical portion 94 of the anvil shown in FIG. 4H, and protrusions 102 and 104 are alternately formed on the opposite sides of the anvil 54 shown in FIG. 4I. In the anvils 54 shown in FIGS. 4J and 4K, the portion extending in the thrust direction is not formed and a number of circular apertures 106 or cut-aways 108 are formed in the inner peripheral edge.

The advantages obtained by the above-described embodiments are as follows. Synthetic resin of a quality small in strength but rich in slidability can be chosen for the sleeve 52 and therefore, the sliding portion between the sleeve and the sliding shaft can eliminate the necessity of lubrication, and this is economical. The driving member 56 is divided into the sleeve 52 and the anvil 54, which are thereafter coupled together, and these two are readily coupled together by integral molding and also, the anvil 54 is formed with the cylindrical portion 64, and this ensures the two to be rigidly coupled together. The formation of the cylindrical portion 64 in the anvil 54 is effective to decrease the expansion and contraction (dimensional variation) of the sleeve 52 because the cylindrical portion 64 provides the bone of the sleeve 52. The formation of the cut-aways 76 or the circular apertures 96 in the anvil 54 prevents relative rotation of the sleeve 52 and the anvil 54. Also, the cylindrical portion 64 of the anvil 54 can be readily made to have high circularity by pressing, forging, cutting or the like, and the sleeve 52 after integrally molded is improved in circularity following the cylindrical portion 64.

A further improved embodiment of the present invention will now be described.

Figure 5:
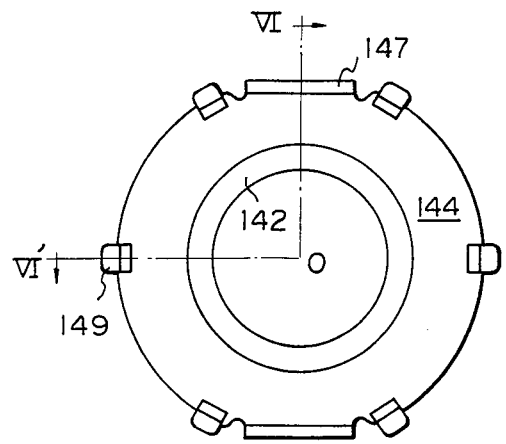
FIG. 5 is a front view showing a fourth embodiment of the present invention.
Figure 6:
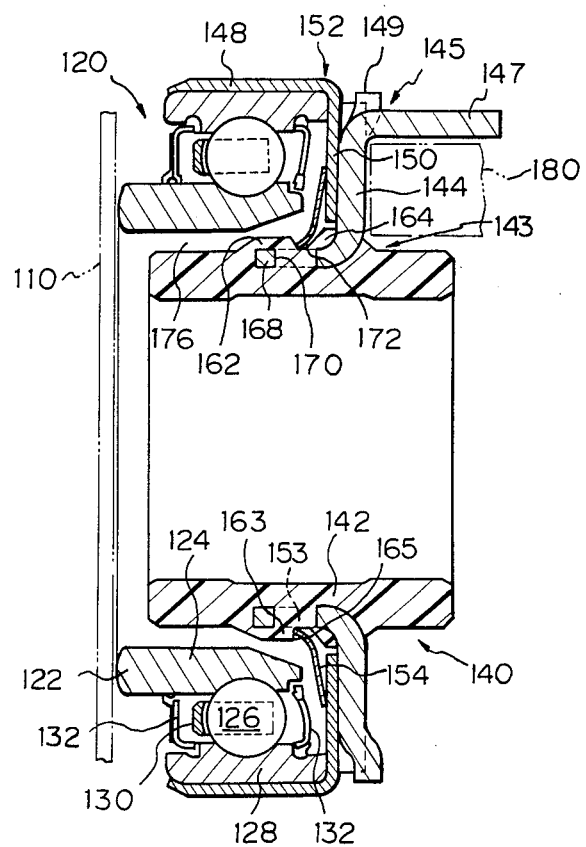
FIG. 6 is a cross-sectional view taken along line VI-O-VI' of FIG. 5.

As shown in FIGS. 5 and 6, a clutch release bearing 120 includes an inner race 124 provided with a portion 122 bearing against a diaphragm spring 110, rolling members 126, an outer race 128, a retainer 130 for retaining the rolling members, a seal 132 for sealing the bearing, and a case 152 including a cylindrical portion 148 and a radial portion 150 and made integral with the outer race 128 of the bearing in the cylindrical portion 148 (instead of the case 152, a part of the outer race 128 may extend radially inwardly). On the other hand, bearing retaining means 140 includes a driving member 143 comprising a sleeve 142 of synthetic resin and a metallic anvil 145 made integral therewith. The anvil 145 comprises a central disc portion 144, a cylindrical portion 168 extending from the inner side of the disc portion 144 toward the bearing side, a fork guide portion 147 extending from the outer side of the disc portion 144 to the opposite side of the bearing, and a radially outwardly extending extension 149, and the inner side portion of the anvil extending from the disc portion 144 to the cylindrical portion 168 is embedded in the sleeve 142. A spring 154 is disposed between the clutch release bearing 120 and the bearing retaining means 140 to urge the bearing 120 against the bearing retaining means 140.

The vicinity of the spring 154 will now be described in detail. Two annular projections 162 and 164 are formed on the axially intermediate portion of the sleeve 142, and the cylindrical portion 168 of the anvil 145 is embedded in the annular projection 162, and the portion ranging from the disc portion 144 to the cylindrical portion 142 is embedded in the other annular projection 164. A plurality of circumferentially spaced apart circular apertures 170 of a predetermined size are provided in the portion somewhat retracted from the fore end of the cylindrical portion 168, and each of these apertures is filled with synthetic resin forming the sleeve 142 and provides a connecting portion 153. In the other part of the cylindrical portion 168 than the apertures 170, metal is directly exposed to the outer surface. The inner end of the spring 154 is contained in a groove 172 formed between the two annular projections 162 and 164 (the bottom of the groove is defined by a part of the connecting portion 153 and the cylindrical portion of the anvil) and bears against the end face 165 of the jaw 163 of one side edge of the annular projection 162.

The operation of the embodiment having the above-described construction will now be described. When a fork member 180 bears against the anvil 145 and applies an axial operating force thereto, the bearing 120 is moved leftwardly as viewed in FIG. 6 through the driving member 143 and the case 152, and the portion 122 of the inner race 124 comes into contact with the diaphragm spring 110 to thereby release the clutch. On the other hand, the self-aligning operation of the bearing 120 is accomplished by the bearing 120 being moved radially by the action of the centripetal force while the radial portion 150 of the case 152 is urged against the disc portion 144 of the anvil 145 by the action of the spring 154. In that case, the clearance 176 between the inner race 124 and the sleeve 142 permits the movement of the bearing 120.

The above-mentioned self-aligning operation is accomplished particularly well by the presence of the apertures 170 in the cylindrical portion 168 of the anvil 145. That is, the apertures 170 are provided at the locations on the cylindrical portion 168 which the action of the spring 154 reaches and therefore, when the sleeve 142 is coupled to the anvil 145 by molding, synthetic resin material permeates in the apertures 170 and as a result, the jaw 163 of the sleeve 142 and the body portion are strongly coupled to each other by the connecting portions 153 in the apertures 170. Therefore, even if a leftward force as viewed in FIG. 6 acts on the end face 165 of the jaw 163 by the action of the spring 154, the end face will not be stripped off from the body portion to create a clearance between it and the cylindrical portion 168, and the spring load will become stable. Also, the sleeve 142 is prevented from being expanded or contracted to separate from the cylindrical portion 168 of the anvil or create a clearance therebetween.

Now, where there is very great eccentricity between the diaphragm and the bearing retaining means, the bearing may cause a great self-aligning movement in the radial direction and the inner race may contact the sleeve, the anvil or the spring to cause seizure. According to the present embodiment, occurrence of such situation is prevented. That is, the annular projection 164 is situated in proximity to the inner side of the inner end of the radial portion 150 of the case 152 and therefore, when the bearing 120 tries to move radially beyond a predetermined amount, the inner end of the radial portion 150 bears against the outer peripheral surface of the annular projection 164 to prevent such movement.

Also, when forming the groove 172 and the jaw 163, it is not necessary that the cylindrical portion 168 of the anvil 145 be subjected to any special working (formation of a stepped portion or the like) and therefore, the cost for manufacturing the anvil 145 is reduced.

Figure 7:
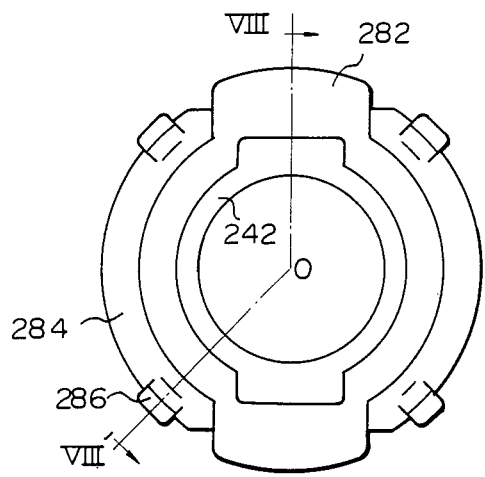
FIG. 7 is a front view showing a fifth embodiment of the present invention.
Figure 8:
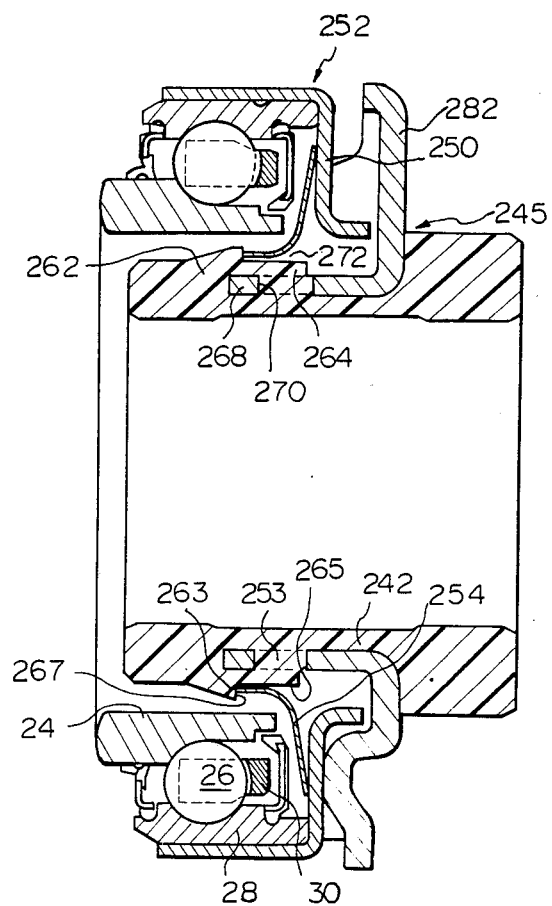
FIG. 8 is a cross-sectional view taken along line VIII-O-VIII' of FIG. 7.

Still another embodiment of the present invention will now be described by reference to FIGS. 7 and 8.

An anvil 245 includes a radial portion 282 against which a fork operating member 180 (see FIG. 6) bears, a bent portion 284 contacted by the radial portion 250 of a case 252, another bent portion 286, and a cylindrical portion 268 embedded in a sleeve 242. Two annular projections 262 and 264 having different outer diameters are formed on the outer peripheral surface of the sleeve 242, and a stepped portion 272 is defined by the flat outer peripheral surface 265 of the annular projection 264 and the end face 267 of the other annular projection 262, and one side edge of the annular projection 262 provides a jaw 263. The inner end of a spring 254 is contained in the stepped portion 272 and bears against the jaw 163. The synthetic resin in the aperture 270 of the cylindrical portion 268 provides a connecting portion 253.

According to the present embodiment, the cylindrical portion 268 of the anvil 245 is embedded in the annular projection 264 and synthetic resin is present on the outer peripheral surface side of the cylindrical portion 268, and the position of the jaw 263 against which the inner end of the spring 254 bears is deviated axially of the sleeve 242 relative to the position of the aperture 270. As a result, the jaw 263 of the sleeve 242 and the body portion are rigidly coupled together by the connecting portion 253 in the aperture 270 and the annular projection 264, and the aforementioned problem that the jaw floats up and a clearance is created between the anvil and the sleeve is obviated. Also, the jaw 263 and stepped portion 272 are molded only by synthetic resin, and this means that they can be molded easily.

Figure 9:
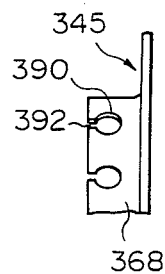
FIG. 9 is a front view showing only the essential portion of a modification of the radially extending portion.

As shown in FIG. 9, open holes each comprising a circular aperture 390 and a slit 392 may be formed in the cylindrical portion 368 of an anvil 345, and even in a case where the closed holes as shown in FIGS. 5, 6, 7 and 8 are formed, the shape thereof is not limited to circle, but those holes may be axially or circumferentially elongated.

According to the above-described embodiments, the jaw on the sleeve for restraining the inner end of the spring can be simply formed of synthetic resin and apertures are present in the inner side portion of the anvil and the connecting portions of synthetic resin integral with the sleeve are present in these apertures and therefore, the jaw is prevented from floating up from the inner side portion of the anvil and thus, the spring load becomes stable. Further, by the above-mentioned connecting portions, the sleeve is prevented from being stripped off from the inner side portion by contraction during the unitary formation of the inner side portion of the anvil and the sleeve.

I claim:

1. A clutch release bearing device including a clutch release bearing, bearing retaining means movable along a fixed guide for guiding said clutch release bearing by a clutch operating fork member and retaining said clutch release bearing for self-aligning movement, and a biasing member interposed between said clutch release bearing and said bearing retaining means to urge said clutch release bearing toward said bearing retaining means, characterized in that said bearing retaining means comprises synthetic resin cylindrical portion made of synthetic resin fitted to said fixed guide, and a metal radially extending portion made of a metal extending radially outwardly from said cylindrical portion and retaining said clutch release bearing for self-aligning movement and engageable with said clutch operating fork member, said metal radially extending portion having an inner end portion, said metal inner end portion being embedded in said synthetic resin cylindrical portion, a metal cylindrical portion being formed on the inner end portion of said radially extending portion and a plurality of apertures being formed in said metal cylindrical portion circumferentially thereof, said apertures being filled with synthetic resin, the positions of said apertures being at positions which can be reached by the action of said biasing member.

2. A clutch release bearing device according to claim 1, wherein an annular projection is formed on the outer peripheral surface of said cylindrical portion made of synthetic resin, said cylindrical portion of said radially extending portion is embedded in said annular projection, one side edge of said annular projection restrains one end edge of said biasing member, and said apertures are situated near said annular projection.

* * * * *